United States Patent [19]

Brotz et al.

[11] Patent Number: 5,020,101

[45] Date of Patent: May 28, 1991

[54] MUSICIANS TELEPHONE INTERFACE

[75] Inventors: Gregory R. Brotz, P.O. Box 1322, Sheboygan, Wis. 53081; Angelo N. Dallas, Sheboygan, Wis.

[73] Assignee: Gregory R. Brotz, Sheboygan, Wis.

[21] Appl. No.: 335,701

[22] Filed: Apr. 10, 1989

[51] Int. Cl.$^5$ .................. H04M 9/08; H04M 1/57
[52] U.S. Cl. .................. 379/389; 379/390; 379/85; 381/118; 84/671
[58] Field of Search .................. 379/85-87, 379/390, 344, 345, 387, 388, 389, 442, 395; 381/671, 118; 84/671

[56] References Cited

U.S. PATENT DOCUMENTS

| 3,787,621 | 1/1974 | Barok | 379/390 |
| 3,922,488 | 11/1975 | Gabr | 379/390 |
| 4,481,382 | 11/1984 | Villa-Real | 379/85 |
| 4,605,975 | 8/1986 | Beaman | 379/87 |
| 4,726,062 | 2/1988 | Martz et al. | 379/390 |
| 4,833,704 | 5/1989 | Hashimoto | 379/85 |
| 4,843,498 | 6/1989 | Graf von Zedlitz und Trützschler | 379/85 |

Primary Examiner—Stuart S. Levy
Assistant Examiner—Joseph A. Rhoa
Attorney, Agent, or Firm—William Nitkin

[57] ABSTRACT

A musicians telephone interface that interconnects an instant location through a telephone line to a remote location such device having inputs to receive the sound from musical instruments and/or vocalization at each location with balancing circuitry and broadcast means at each location for the musicians at each location to hear the music of one another simultaneously balanced for collaboration and production of music.

4 Claims, 8 Drawing Sheets

MUSICIANS TELEPHONE INTERFACE

BACKGROUND OF THE INVENTION

1. Field of the Invention

This invention resides in the area of telecommunications and more particularly relates to a telephone interface to interconnect the musical output of musicians at different locations so that a first musician can not only hear the music of other musician(s) at remote locations as the first musician plays but also such first musician can receive feedback of his own music. Thus each musician while playing over the telephone at remote locations from one another can contribute to the resulting musical work.

2. Description of the Prior Art

At present musicians must be in the same location in order to play together. Collaboration of musicians is highly desirable in the area of musical composition. Telephone interfacing has been utilized to interconnect game apparatuses so that two remote players can play a single game with each player receiving data over the telephone indicating the move of the other player such as disclosed in U.S. Pat. No. 4,372,558.

SUMMARY OF THE INVENTION

It ia an object of this invention to provide an apparatus that provides a telephone interface between musicians at different locations for the development and production of joint musical works. To operate the device of this invention each musician at his location may be provided with an optional telephone or may use his current telephone to initiate the call. Microphone inputs may also be provided for musical instruments which have no electrical output or vocal performance which microphones provide output to pass through a mixing board to the input of the device of thIs invention. The microphone output of the musicians' instruments and any vocal performance can also be directed to a speaker that also receives output from the device of this invention broadcasting signals emitted through the telephone lines from the musicians at the remote location who are also utilizing similar devices. In this way musicians or groups of musicians not only can hear the music that they are playing but also can simultaneously receive and hear the input coming over the telephone lines of the remote musicians. The device of this invention can balance the various inputs to the speaker, providing each musician with his own selective level of auditory feedback as well as the sounds of the remote musicians.

It should be noted that analog and digital multiplexing techniques in use now on telephone lines can be utilized by the device of this invention to send the music simultaneously back and forth on the telephone lines and to receive such music without substantial signal loss or other muting effects when such signal is demodulated. The device of this invention can amplify each sound channel to balance the incoming music level from remote locations with the music level of the musicians at the instant location so that the sound level at the remote location can be substantially at the same sound level of the musicians at the first location. It is important that any telephone line timesharing system utilized not require significant band filtering systems which could cause a loss of fidelity in the music. It is envisioned that the structure of this invention will employ a plurality of local inputs at each location and can include either a telephone within the device or a telephone handset interconnection. The device provides metering means for balancing the input from the remote location and the input from the first location and interconnection to the speaker either directly or through an amplifier so that the user(s) at the first location can hear a balanced production of the music from the second remote location. Tape recorders with multiple tracks can record each musician's part of the musical work on separate tracks at their location for later mixing. Also there can be more than two remote locations with such multiple locations including a music studio.

DESCRIPTION OF THE PREFERRED EMBODIMENT(S)

Figure 1:
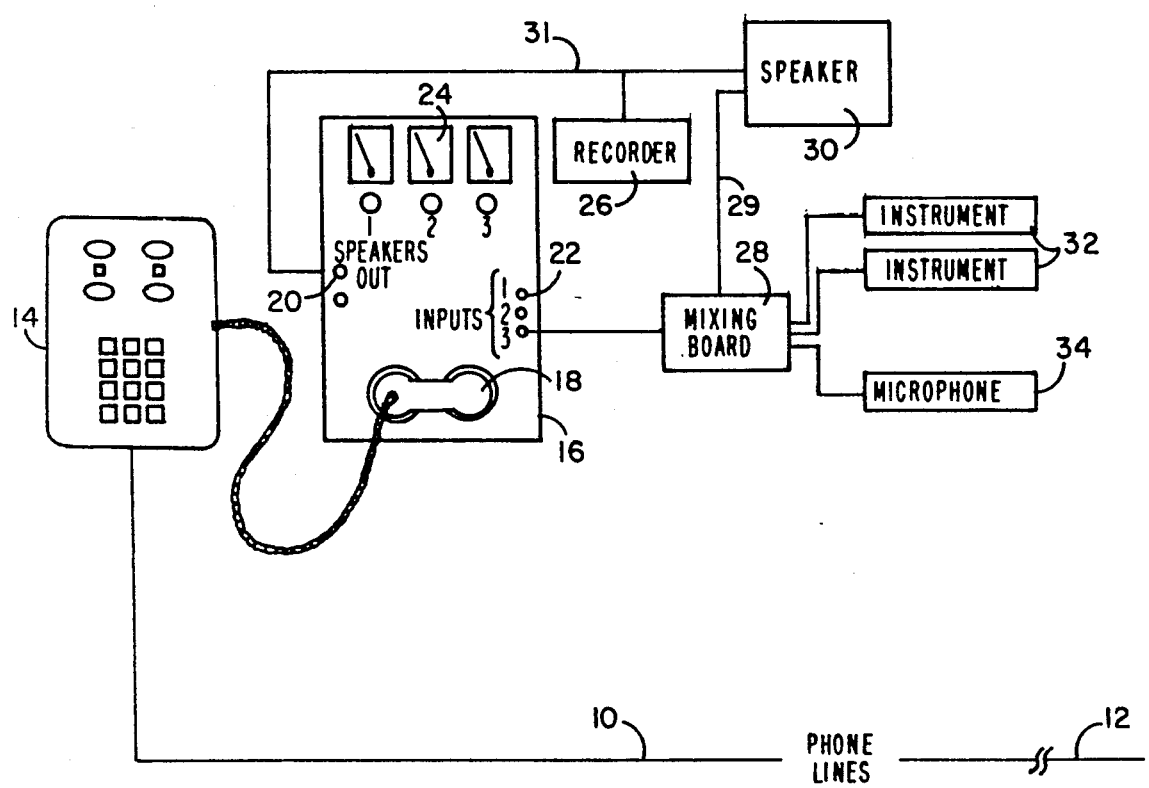
FIG. 1 illustrates a block diagram of the system of this invention and its interrelation to the telephone line, musicians and vocalists.

FIG. 1 illustrates a block diagram of one embodiment of the musicians telephone interface system of this invention showing the second remote location telephone line 12 which is interconnected to telephone line 10 at the first instant location of the first group of musicians, referred to hereinafter as the instant location. Line 10 extends to a typical telephone 14, the handset of which is interconnected to device 16 of this invention within handset receiver module 18 such as are well known in the art. In some embodiments telephone 14 can be incorporated directly into the device of this invention, and there is no need to use the existing telephone at each location but only to interconnect to the telephone lines. At the instant location one or more instruments 32 can be utilized and a vocalist 34 can utilize a microphone but the number of instruments and/or vocalists is completely variable depending upon the wishes of the users of the device of this invention. The output of the instruments and/or vocalist passes through mixing board 28 which process is also well known in the art to balance such outputs for better sound and then the output can be directed to input 22 of the device of this invention which directs it over telephone line 10 to remote location 12. That output from musical instruments 32 and/or vocalist 34 also can be directed through mixing board 28 to speaker 30 at the instant location which can have the sound amplified and directed back in such a way that the musicians and vocalists can hear such sound combined with theirs at the instant location. At the same time that the foregoing is occurring, a similar device is in use at the remote location with the sound signals coming back over telephone line 12 from line 10 from the instant location. As mentioned above the sounds can be multiplexed through a variety of well-known telephone line transmission methods and these incoming musical sounds can be directed into device 16 of this invention where they can be provided through an amplifier to output 20. Output 20 can be interconnected to speaker 30 and its volume level can be balanced by adjusting the output of the amplifier, the output level of which is indicated by meters 24. It is desirable in some cases to balance the sound output from speaker 30 with the sound that the instruments at the instant location are directing through the mixing board to the same speaker. In this way the musicians at the instant location can hear the sounds of the instruments at the remote location or the vocal input at the remote location balanced through the speaker giving the illusion that the instruments at the remote location are being played at the instant location. In many instances an amplifier will have to be incorporated within the device of this invention to amplify the telephone line signals to be significantly louder so that these signals will be in balance with the sounds of the musician(s) at the instant location. While this process is going on at the instant location, the same process is going on at the remote location allowing those musicians to hear the instruments and vocalists of the instant location as loudly as they hear their own music through their own speaker. Recorder 26 can also pick up the signals of both the instant location over line 29 and the remote location from line 31. Recorder 26 can be of the type to provide a sound track for each musician at the instant location so that his work can be recorded separately and later balanced even more accurately for a final production of the music. It should be noted that the device of this invention can also be incorporated in a music studio which has more sound-balancing equipment than is usually available in a home environment. The use of the system of this invention allows a plurality of musicians playing from different locations to collaborate in the creation of new musical works while saving time and expense of traveling to a single location.

Figure 2:
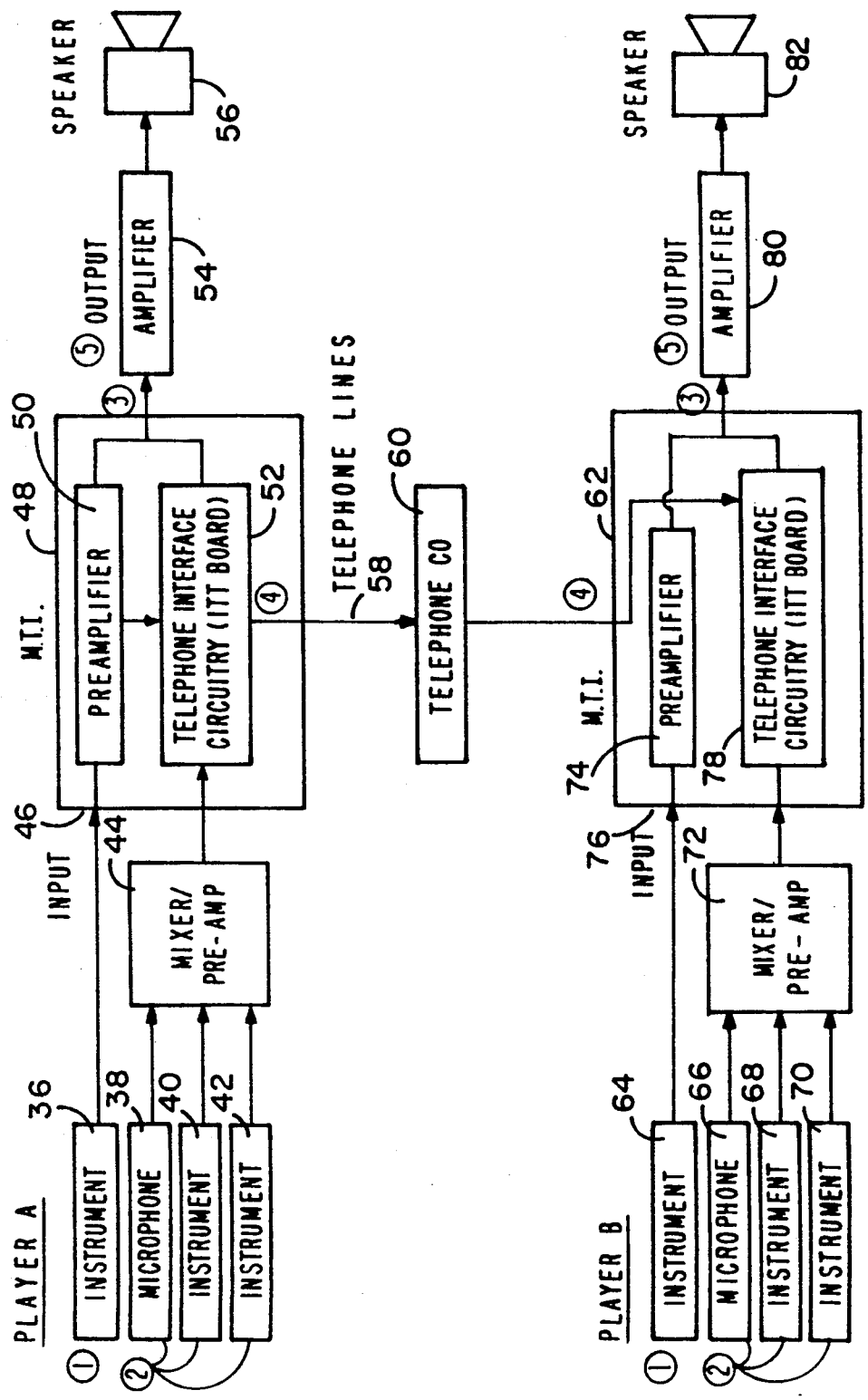
FIG. 2 is a block diagram of musicians telephone interface units.

FIG. 2 illustrates a more detailed view in block diagram of the structure of the system of this invention. In this view is shown instrument 36 plugged directly into input 46 of musicians telephone interface 48. Instruments with preamplifiers would be routed directly to the interface circuitry without the need of passing through preamplifier 50. Alternately microphone 38 or instruments 40 and 42 can also be plugged into mixer preamp 44 from which the amplified signal is directed to the musicians telephone interface 48. When an instrument is directly attached such as at input 46 to the musicians telephone interface 48, its signal is first directed through preamplifier 50. In this way both instruments with or without preamplification or mixing can be utilized with the device of this invention. Preamplifier 50 can amplify voice, instruments or any signal from input jack 46. There can be at least three input jacks into the unit and another three for output. There are generally three types of impedances that are commonly used in the music industry: 600 ohm Z, 1200 ohm Z and balanced line Z. Guitars, microphones and tape recorders all have different types of jacks which enable the industry to identify their circuit's impedance. If one circuit's output is, for example, 600 ohm Z and it is fed into a circuit with 1200 ohm Z, then there is a substantial loss in power transference due to the imbalance of the output and input of the circuit. Having the different types of jacks and corresponding circuits for each jack help maintain high fidelity standards. Telephone lines 58 would run from musicians telePhone interface 48 to telephone company 60 which lines would interconnect to a second musicians telephone interface 62 at a remote location where the signal would pass to telephone interface circuitry 78 and then to an amplifier 80 for output at speaker 82. Direct signals from instrument 64 at the second location or from microphone 66 or instruments 68 and 70, which are directed through mixer preamp 72, enter remote location's telephone interface circuitry 78 and also are directed to amplifier 80 and speaker 82 along with the signal from the first location coming over telephone lines 58. Instrument 64, not being preamplified, utilizes input 76 to make use of preamplifier 74 of musicians telephone interface 62. At the same time, the signal from the second location runs back to the first location through telephone company 60 along telephone lines 58 where it, too, is processed through telephone interface 52 and sent out to amplifier 54 and to speaker 56 so that at both locations the signals of both the musicians at the first location and second location can be heard simultaneously at each location at the same audio levels. There is usually a telephone line bandwidth of 2700 hz. Some standard telephone company bandwidths include the frequency ranges of 300-3000 hz. Wider bandwidths are available but must be ordered with other pertinent tolerances from the telephone company in which case a "cable pair" will be dedicated but will only run between two fixed locations. Due to some telephone lines' bandwidths being much narrower than the wide bandwidth and spectrum that music and vocals fall into, in some cases there will be losses and possibly even some additions to the original music being sent over such telephone lines.

Figure 3:
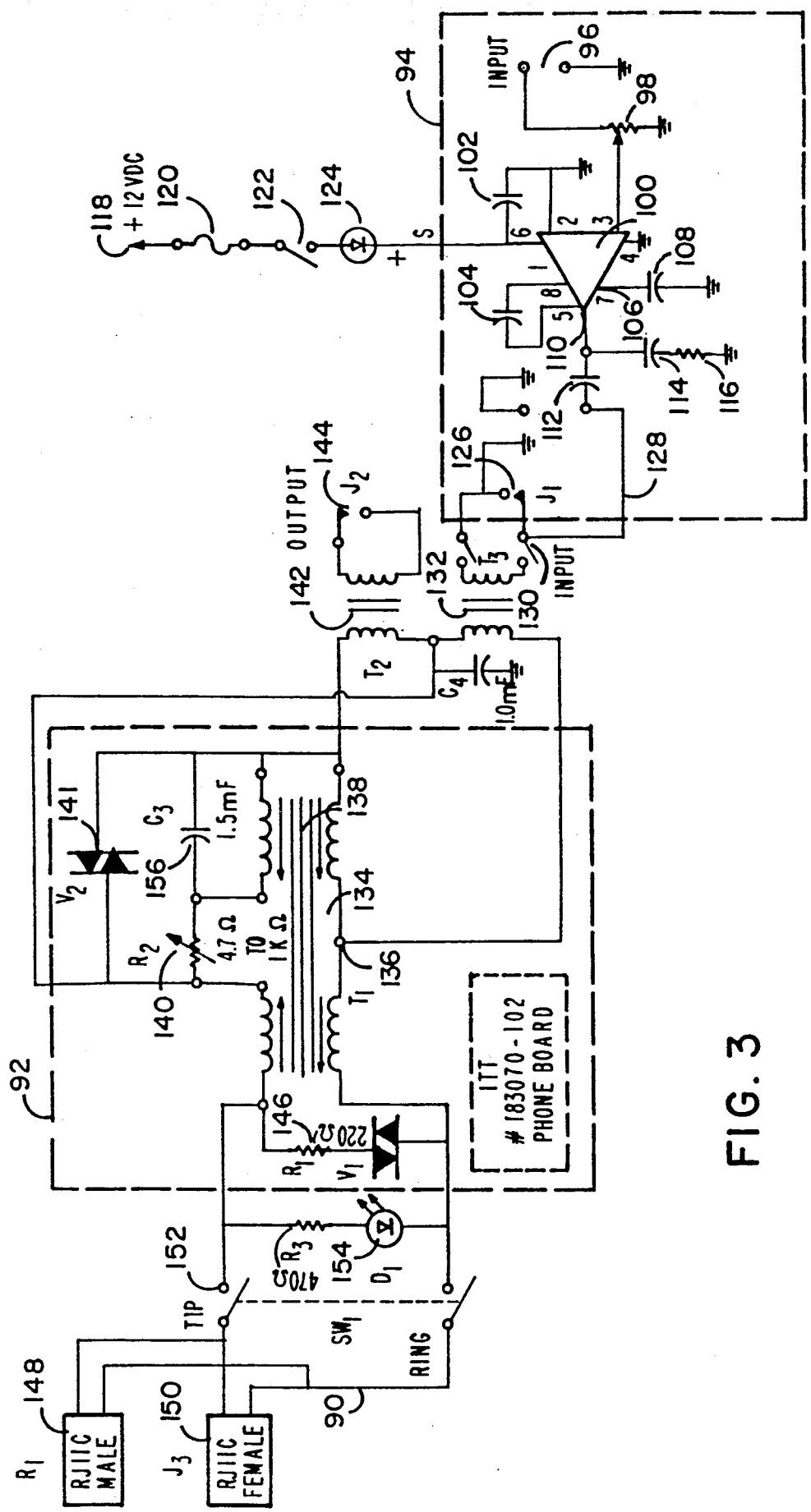
FIG. 3 illustrates a schematic diagram of the circuitry of the musicians telephone interface.

FIG. 3 illustrates a schematic diagram the one embodiment of the circuitry that can accomplish the desired function of the device as described in FIG. 2. In this circuitry can be seen the preamplification circuitry in the dotted box denoted by numeral 90 and the telephone interface circuitry which is provided by the telephone company in the dotted box denoted by the numeral 92 which can be a typical telephone company interface board as described below. Block 94 also denotes the input circuitry for direct input into the musicians telephone interface without the need for further preamplification. Each one of these inputs has two input components, the first for hIgh impedance and the second for low impedance, the first basically being for microphones and the second, for instruments. The output of the unit is monophonic since a telephone line is monophonic although if two telephone lines are used with a musicians telephone interface at each end, a stereophonic effect could be achieved. Within block 94 is input 96 which has variable resistor 98 ranging from 0-10 k ohms, such resistor being variable to adjust the level of input. There can be more than one musical instrument output running into input 96 as several instruments could be plugged into a series of instrument plugs at the same time, all being interconnected to input 96. Variable resistor 98 controls the input level, and such input is then directed to amplifier 100 which can have a 200 gain. Amplifier 100 forms a preamplifier in this circuit. Depending upon the number of instruments interconnected to input 96, the variable resistor will be adjusted to direct the output voltage to amplifier 100 and its output will be controlled by variable resistor 98. Capacitor 102 can be a 1 mfd bypass capacitor on amplifier 100 which capacitor is used for filtering out the noise of power supply 118. Power supply 118 can be a 12-volt DC power supply, and it is important to utilize such a bypass capacitor to filter out any noise on the amplifier as any such noise is multiplied by the gain amount which amplification would be significant. Capacitor 104 is a 10 mfd capacitor also on amplifier 100 and is used to adjust the gain of the amplifier. At pin 7, designated 106 on amplifier 100, is bypass capacitor 108 which is a 100 mfd capacitor and which extends to ground and is also used for filtering. Pin 5, designated 110 of amplifier 100 is the amplifier output, and the output runs to two capacitors 112 and 114. Capacitor 112 is the output capacitor, and capacitor 114 along with 10 ohm resistor 116, extending to ground, help to develop the output signal since the higher frequencies are amplified less than the lower frequencies and the lower frequencies are basically much louder than the higher frequencies within the circuit. By putting 0.047 mfd capacitor 112 into the circuit the lower frequency based signals are impeded and the higher frequency signals are allowed through the capacitor. When an instrument or microphone is plugged into the preamplification circuit 94 and variable resistor 98 is adjusted, the output produces a larger signal with little or no distortion. In practice it has been found that amplifier 100 can be a Radio Shack IC chip part no. 2761731 or equivalent which is a 0.4 watt audio amplifier and can be used with a battery or with other types of power supply. The amplifier's power supply 118 can extend from a 12 volt DC source through fuse 120 and switch 122 and also through an LED 124 to indicate that the unit's amplifier circuit has power applied when the LED is lit. The preamplification circuit denoted in block 94 attaches to the telephone interface circuitry. Second input 126 is a jack which can be a ¼ inch monophonic plug which allows the player to plug directly into the interface circuitry if the preamplification circuitry is not needed and this input point is a common point between the two circuits. Line 128 from capacitor 112 extends over and attaches at point 130 onto the jack side of transformer 132 beyond jack 126 so :hat when an instrument is plugged into input 96 of the preamplifier, it is already wired and interconnected to the telephone circuit board. At the same time, jack 126 can be utilized when a source already having amplification is plugged into jack 126 for connection into the telephone circuitry. As shown in FIG. 2, some instruments and microphones may extend from a mixing board with preamplification circuitry on it which will interconnect directly at jack 126 at the input of the interface board 92. The board, as illustrated and designated by numeral 92 and surrounded by dotted lines, is basically an ITT part no. 183070–102 telephone board and this input to transformer 132 directs the input signal across the transformer to the secondary side of the transformer where the signal then goes in two directions. It first goes to transformer 134 at point 136. This transformer on the telephone company board is a 600 ohm matching transformer with a one-to-one ratio. Zener diode 141 can be utilized as a ringer voltage protector to prevent any electrical surges during use which might otherwise damage the amplification circuitry. Transformer 134 is interconnected to the telephone line which also directs the signal in two directions, one direction being over coil 138 back to transformer 132 but the transformers act to prevent any DC line voltage going back to the preamplification circuitry within block 94. The use of a transformer prevents any confusion of bias within the circuitry and is used to couple the signals and provide them with a safety margin in case of any ringing voltage on the line or other electricity coming back over the line. The signal extends from the bottom of transformer 132 up to transformer 134 which basically comprises two transformers. On the left side of transformer 134 is the output, and the right side of transformer 134 develops the side tone. Resistor 140 which can be a variable resistor in one emodiment or a 47 ohm resistor in another embodiment controls the level of signal current generated through to transformer 142 to which a portion of the signal is directed and which is the output transformer extending to jack 144 which is the output of the musician(s) at the instant location. This is further referenced by resistor 146. Extending from interface board 92 are male telephone jack 148 and female telephone jack 150. Jack 148 plugs into the wall of the building. One would plug the male jack of the telephone into female jack 150 so that one could initiate the telephone call from that telephone. Once contact was made and the circuit completed to the remote location, one would switch on the musicians telephone interface at switch 152 which is a double-pole single throw switch which then hooks the telephone line to the musicians telephone interface. When these telephone lines are connected and switch 152 is on, LED 154 is lit which shows that there is telephone line voltage on the circuit and that the musicians now have the ability to utilize the musicians telephone interface. The telephone could now be hung up and the musicians would simply use the microphone or instruments for playing music or for verbal communication providing that the preamplification had been turned down. If the musicians were using a circuit with preamplification, then they might plug directly into line input jack 126 to communicate back and forth. In some embodiments by adjusting the amount of resistance at resistor 140, the users may be able to quiet or eliminate their own talking on their own side tone, but the circuit's self-balancing feature may make such adjustment unnecessary. Near resistor 140 is a 1 mfd capacitor 156 which is used to filter out unwanted noise generated on the telephone line. Special effects equipment or recorders can also be utilized in conjunction with the circuitry.

Figure 4:
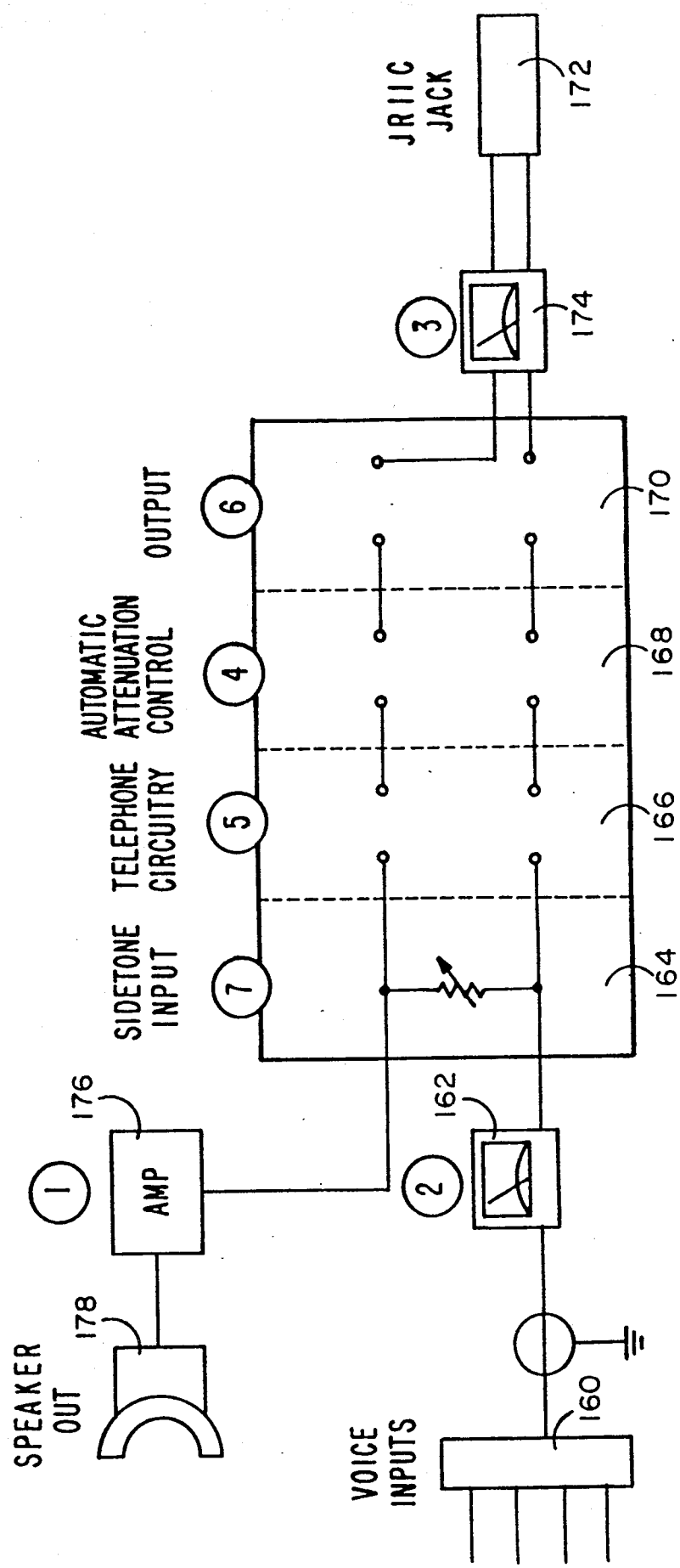
FIG. 4 is a block diagram of musicians telephone interface circuit structure.

FIG. 4 shows a block diagram with some of the elements of the circuitry blocked out where inputs 160 can be directed through a VU signal level meter 162 to monitor the level of such inputs. A side tone input where the user's sound is fed into his own earpiece can be utilized if desired since it is not anticipated tbat a side tone would be part of the telephone circuitry. The signal is then fed to interface circuitry 166 and automatic attenuation control 168 can maintain a positive level of 100 dbm input. Output 170 allows the signal to be directed to telephone jack 172 and a VU signal level meter 174 can be utilized to monitor the level of output of the telephone line to meet the telephone company's restrictions of −100 dbm input on telephone lines. The signal can also come back out through the circuitry carrying both first location inputs and the inputs from the second location over the telephone lines to amplifier 176 and out speaker 178 to achieve the desired results of the circuitry. It should be noted, however, that one cannot isolate any incoming signals merely by controlling the side tone and that to do so one must utilize the other controls, as discussed herein. It should also be noted that one could utilize two separate telephone lines at each location and four musicians telephone interface units at the end of each telephone line which would provide a stereo effect within the bandwidth of the telephone company equipment. This equipment arrangement would help a musician should he need to hear the musician at a remote location louder than he hears his own signal although such arrangement of separate telephone lines at each location would be more costly.

Figure 5:
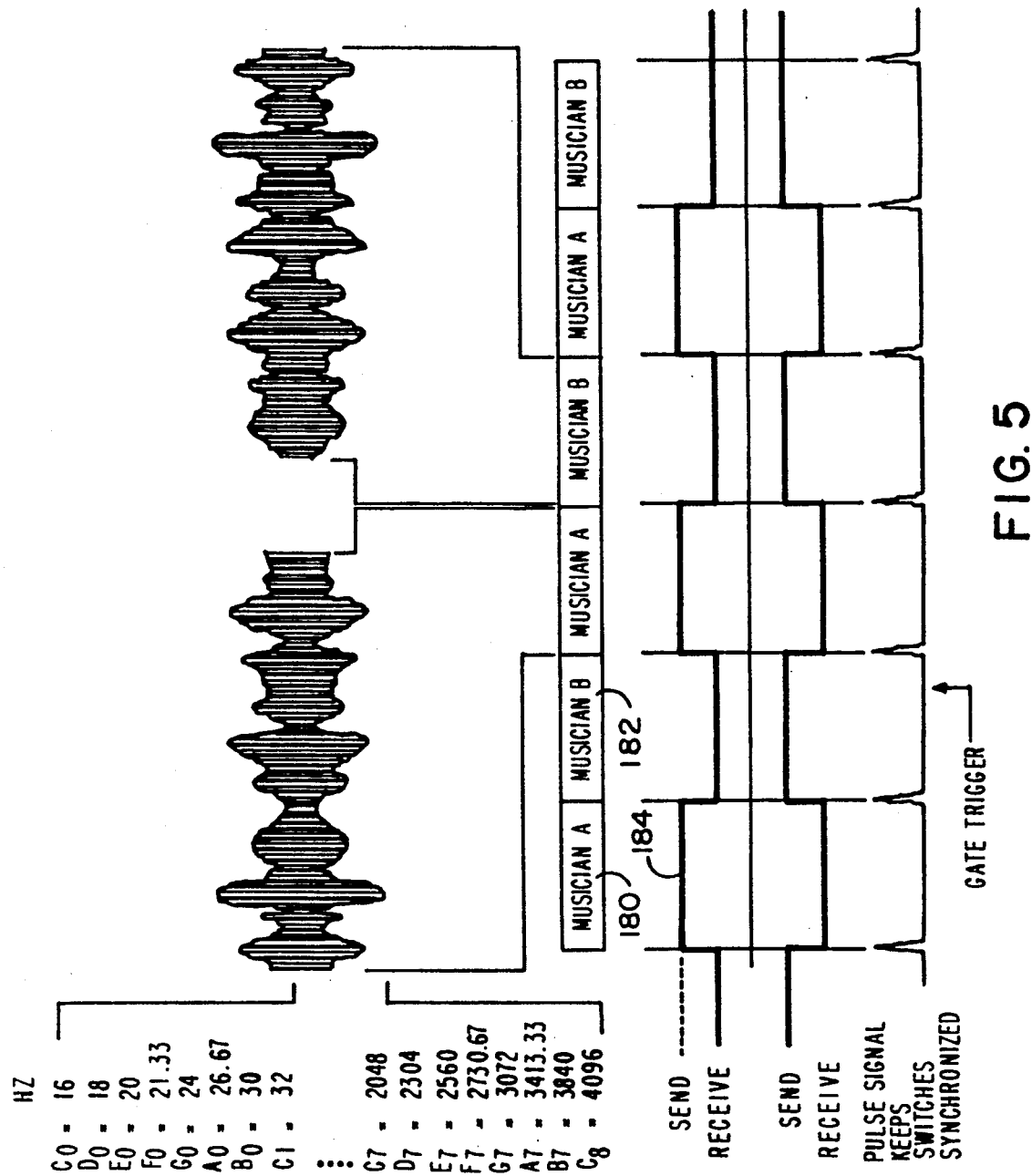
FIG. 5 is a diagram of pulse signals between instant and remote musicians telephone interface units.
Figure 6:
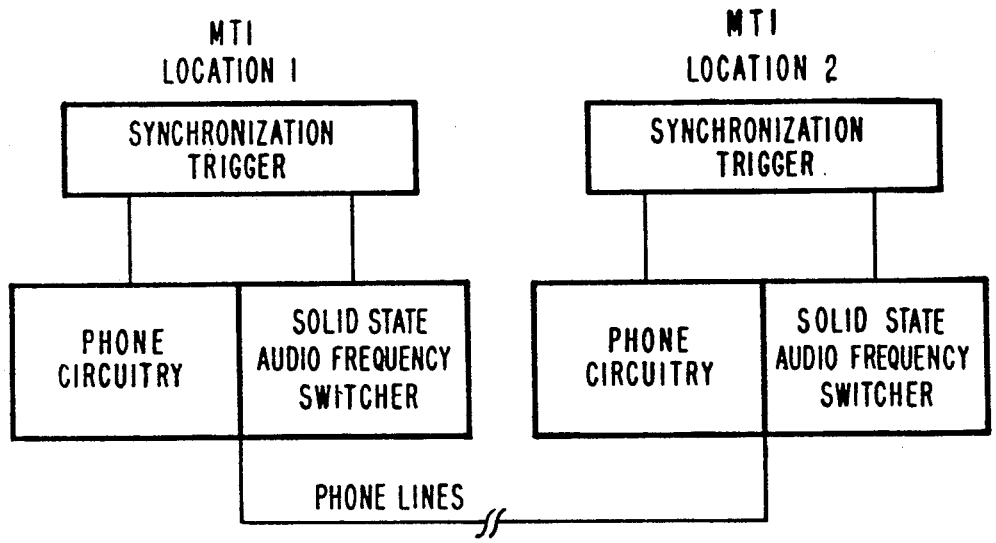
FIG. 6 is a block diagram of synchronization of pulse signals for each musicians telephone interface units in a digital system.

FIG. 5 is a diagram showing signals being synchronized over a telephone line, and FIG. 6 shows a solid state switcher which switches at the speed of thousands of hertz which can help direct and synchronize such signals including all of the audible frequencies. Block 180 for musician A and block 182 for musician B are depicted to represent time slots, and the square wave graph 184 shows when the musician telephone interface at the instant location is receiving and when the musicians telephone interface at the remote location is sending and during the next time slot when the musicians telephone interface at the instant location is sending and the musicians telephone interface at the remote location is receiving. Although this sending and receiving occurs thousands of times per second, the human auditory system hears a uniform sound. The switching speed must be fast enough so as not to interfere or reduce the quality of the sound for free interaction of the music back and forth for meaningful comprehension at each end. FIG. 5 shows switches 186 and 188 at each musicians telephone interface location so that one location can direct the signal to another if there is any synchronization problems on the line. Should the solid state frequency switches have a low rate of time drift, synchronizing triggers 190 and 192 at each location can be used at long intervals to bring the systems back into synchronization, possibly only every 5 minutes or so. The synchronization tone should not be annoying to the musicians and would adjust the musicians telephone interface so that the gates of the pulses will be clearly synchronized for best tone. Once the switching systems were in synchronization, they would take a long period of time to go out of synchronization. Some units could have a metronome built into them for assistance not only to the musicians in keeping a musical beat but also which could act as such a switching trigger to maintain synchronizing signals. Should the lines be in such a condition that a synchronizing signal must be used at a higher frequency, there could be a series of selection buttons to direct such a signal and which would also provide the signal at a frequency in the key in which the musicians were playing which then would create only a slight humming on the line which as long as it were in the same tone and key as the musicians were playing, it should not be of annoyance.

Figure 7:
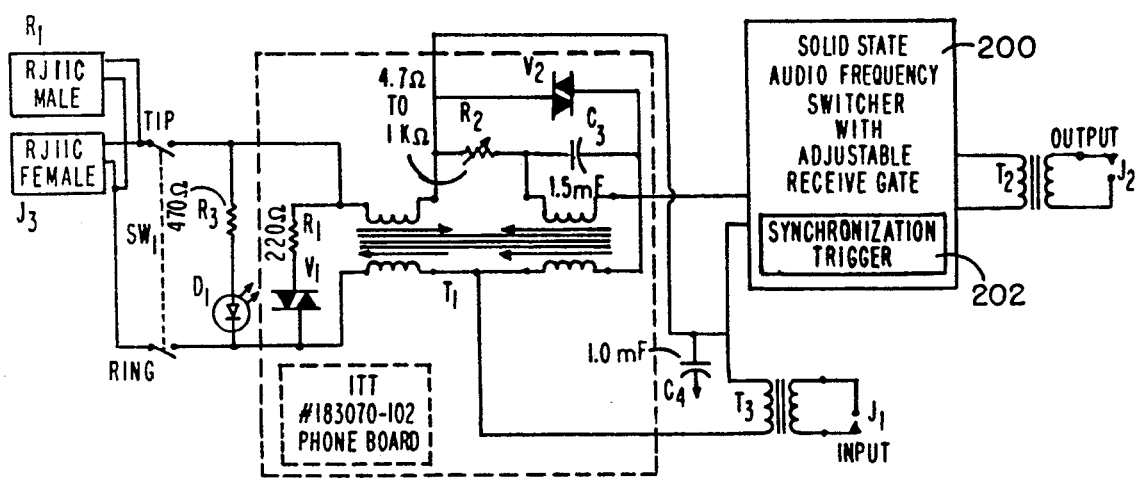
FIG. 7 illustrates a schematic diagram of circuitry showing the placement of synchronization circuitry.

FIG. 7 illustrates a portion of the circuitry with an adjustable receiving gate 200 thereon with a synchronization trigger 202 which would allow the user to pick out various time portions and adjust the amount of his own feedback relative to the remote signal.

Figure 8:
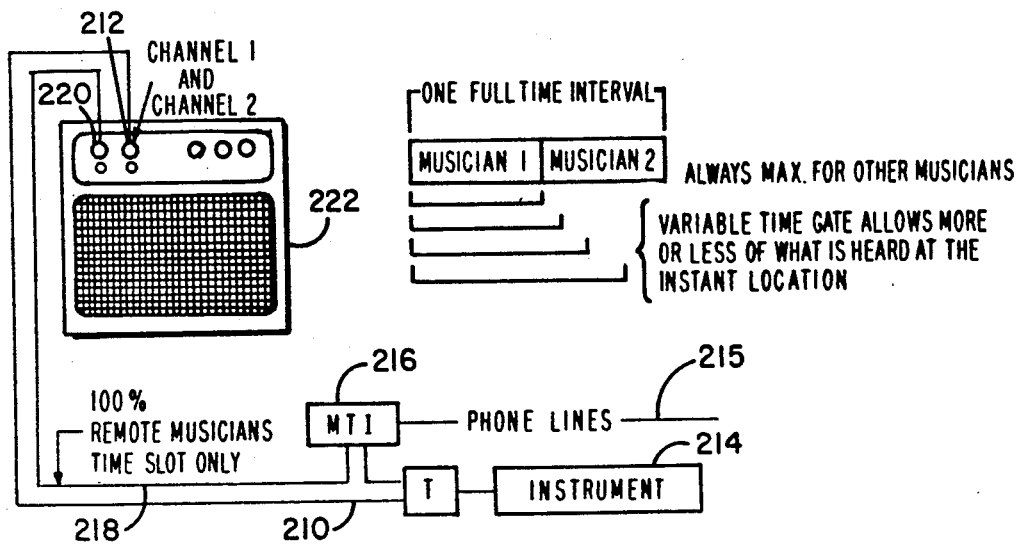
FIG. 8 illustrates an alternate embodiment with the instant location's output directly amplified at the instant location.

FIG. 8 illustrates the arrangement where the musician at the first location can channel his signal directly to a channel of the musical amplifier 222 to allow for his signal's full audio quality at the instant location as it does not direct such signal through line 210 directly into input 212 while at the same time the second signal from instrument 214 is also directed through the musicians telephone interface 216 along line 218 to input 220 on amplifier 222. Since the other channel of amplifier 222 is dedicated to the remote musician's time slot only through jack 220 which carries the remote location signal from telephone lines 215, the first musician can control the level of feedback volume relative to the remote musician's part even if the remote musician's volume is louder than his own feedback volume. This alternate embodiment may be helpful in certain situations.

Figure 9:
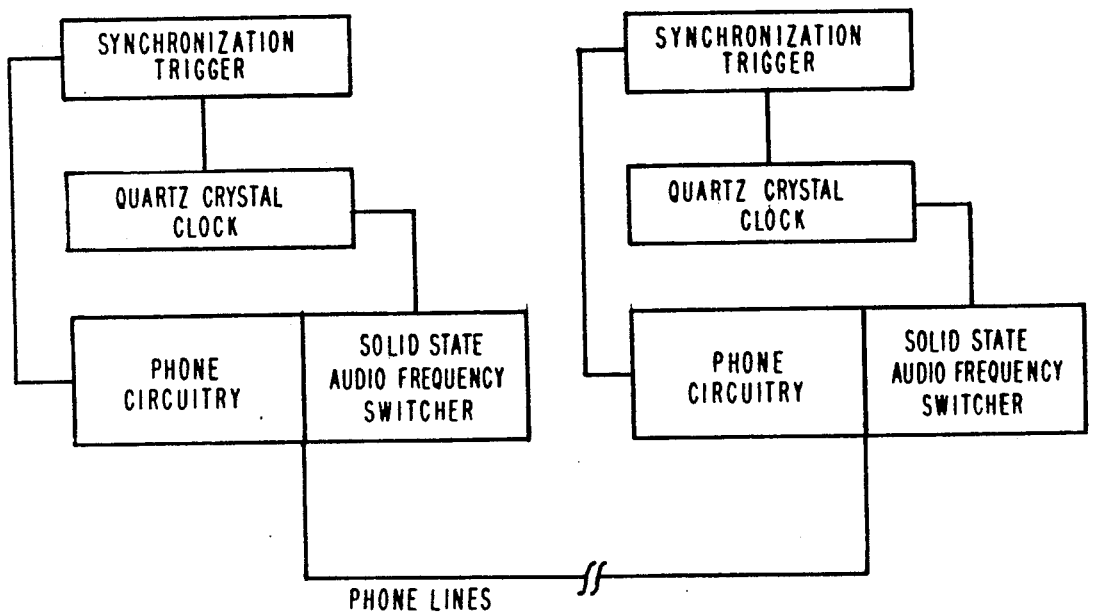
FIG. 9 illustrates signal synchronization by a quartz crystal clock.
Figure 10:
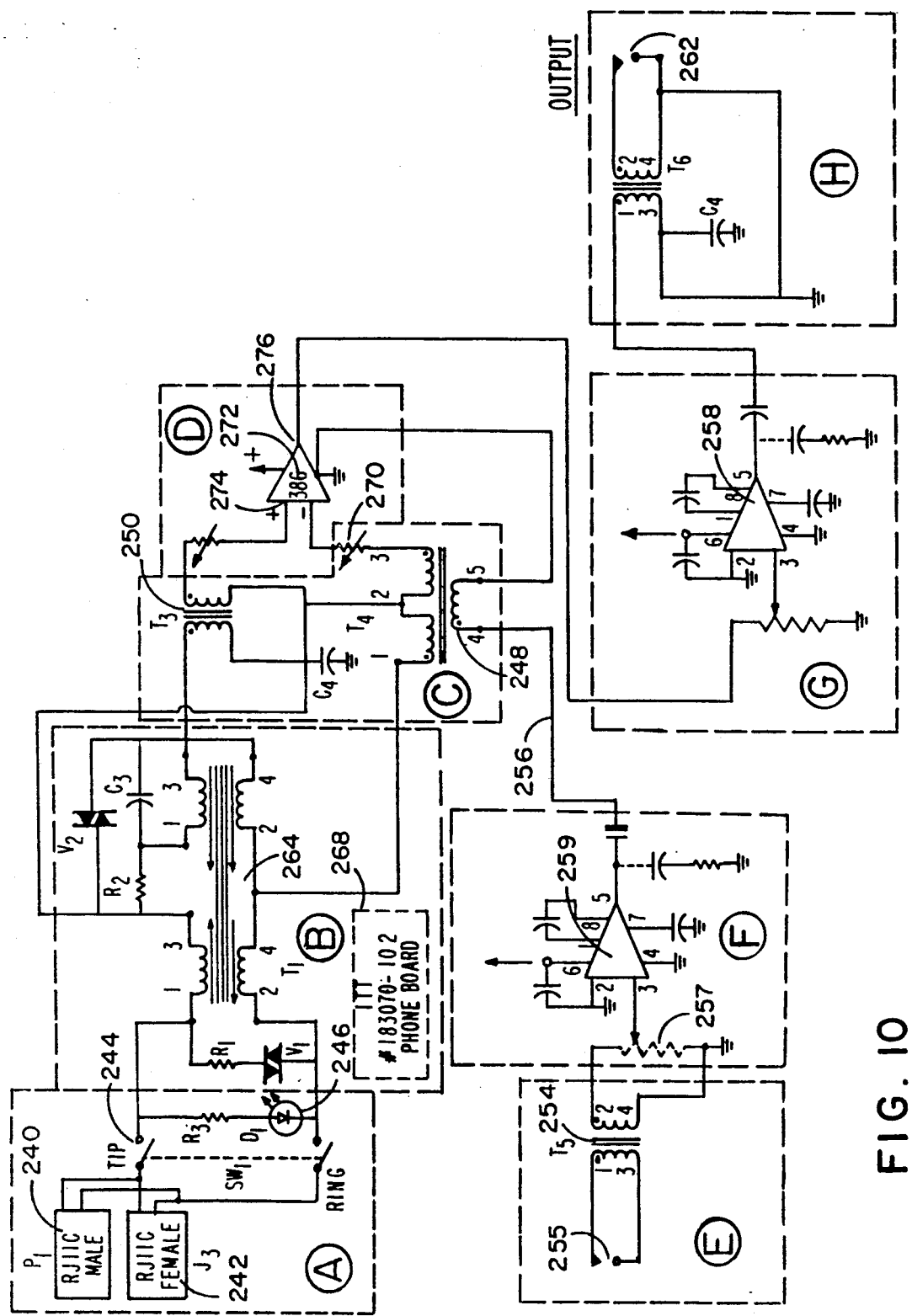
FIG. 10 illustrates an alternate embodiment of the circuitry for the musicians telephone interface unit.

FIG. 9 shows a similar switching circuitry at first location 222 and second location 224 where the synchronization trigger 226 is directed by quartz crystal clock 228 to audio frequency switcher 230 to keep the signals in synchronization.

in an alternate embodiment shown in FIG. 10 a somewhat similar circuitry as that seen in FIG. 3 can be provided with the telephone line input seen in Block A with a standard telephone company male plug RJ11C 240 at the end of a long cord and a standard telephone company female jack 242 that can be mounted on the casing of the musicians telephone interface. These jacks allow the user to unplug his telephone from the wall and to plug the musicians telephone interface unit into the wall using plug 240 and to plug his telephone's jack then into the musicians telephone interface unit's female jack 242 on the casing of the musicians telephone interface. Switch 244 is provided within the unit to mechanically interconnect and disconnect the musicians telephone interface to the telephone lines without having to physically disconnect the musicians telephone interface from female jack 244 when the device is not in use so that the telephone will operate in a normal fashion when switch 244 is off and when it is on, the musicians telephone interface unit will operate. An LED lamp 246 is positioned next in the circuit which when lit will display to the user that the musicians telephone interface unit is on line and is therefore electrically connected through the telephone lines.

Block B is a typical telephone network and spacer assembly. The one being illustrated is an ITT phone board part no. 183070-102 which has been modified but which meets the necessary requirements of telephone systems for interface circuitry. Transformer 264 in Block B allows the signal from the instant location that is coming on line 268 to be split with a portion directed to the left and out telephone jack 240 to the remote location and with another portion of the split signal directed through interstage coupling transformer 250 located in Block C. The signal from the instant location's input runs along line 256 to transformer 248 located in Block C where a portion is split to run on line 268 up to transformer 264 as described above and the other portion is directed through a variable resistor to comparator circuitry in Block D. At the same time, the signal from the remote location comes through telephone jack 240 and is directed along transformer 264 to transformer 250 which couples both the remote and instant location's audio signal and transfers them to the comparator circuitry so that the instant location's signal is directed to the comparator circuitry both through transformer 248 out of pin 3 through variable resistor 270, and such signal also comes from the portion that is split through transformer 264 through interstage coupling transformer 250. The comparator circuitry in Block D utilizes an audio amplifier chip 272 which can be a 386 low voltage audio power amplifier such as Radio Shack part 276-1731 which receives both the incoming remote signal through its positive input pin 274 and will amplify such input signal and produce an output at pin 276 which is in phase with respect to its input signal. The negative input pin 278 on comparator 272 also amplifies its input signal which is directed from pin 3 of transformer 248 being the instant location input signal which also has been directed to the remote location but at the same time a portion of which has been directed through variable resistor 270 to negative input 278 of comparator 272. The signal at the positive input of comparator 272 is 180 degrees out of phase with respect to negative input signal on negative input 278. When the two input signals, one coming into positive input 274 and the other coming into negative input 278 on comparator 272, are identical in frequency and amplitude but are 180 degrees out of phase, the resultant signal will be zero in reference to such input. Variable resistor 270, when adjusted, affects the amount of the instant location's signal that is directed to the instant location's audio output running through the preamplifier circuitry in Block G and the transformer coupling in Block H. The comparator circuitry using amplifier 272 compares the instant location's audio output to that which is currently on the phone lines at the instant location and then it amplifies both signals. The resulting output will only be that of the audio signal sent from the remote location since the instant location's signal will cancel itself out, and the only signal heard coming from the comparator over the instant location's amplifiers will be that of the remote musician's actual output. By varying resistor 270, each instant location can independently control the amplitude of its input into the comparator's negative input 278 which will allow the musicians to control the amount of the sidetone which is commonly referred to as feedback. If they wish to hear their own feedback at their own location, they can adjust variable resistor 270 to eliminate the cancellation of the instant location's signal coming from the comparator circuitry. When variable resistor 270 is adjusted so that the signal is in phase, the instant location amplifiers will also receive and amplify the remote location's signal and also the instant location's signal as well. Within Block G is the preamplification circuitry which also includes amplifier 258 which is needed to drive other amplifiers, mixers or speakers. Block H is transformer 260 which is used to provide the maximum power transfer from one stage to the next with the least loss due to improper impedance matching of the circuitry. The speakers or other amplifiers are attached at output 262 at the instant location to hear either the remote location's sound or the combination of the remote and instant locations' sound depending upon the desires of the users at each location.

In order to input the sound of the instant location into the system, Block E provides an input transformer coupling being transformer 254 with an input jack 255 to receive the signal with the least loss due to any improper impedance matching in the circuitry. Each musical instrument or microphone can be plugged into a separate input unless the musicians use a mixer or other similar piece of equipment which combines the various input signals into one. The output of the mixer(s) then would be plugged into the musicians telephone interface's preamplifier input. The preamplifier circuit is in Block F which includes amplifier 259 which boosts the audio signals to overcome any circuit losses that have occurred within the circuitry and also includes a variable resistor 257 which allows each musician to adjust the amount of amplification of his instrument or microphone into the input of the musicians telephone interface system. The signal, though, if it is already preamplified, can plug into an input port similar to Block E which would merely bypass the preamplification stage of Block F and be interconnected directly with primary winding pin 4 of transformer 248 as seen in the drawing and continue in its operation.

It should be understood that whenever the term "telephone line" is used in these specifications and claims, that such term also includes utilization of this system over other lines such as cable or even by satellite transmission. It is possible to use cable television lines to act as the line between the remote and instant locations. The cable line can be provided through local cable television companies that interconnect many locations within a city. In an alternate embodiment a dedicated cable line can be run from one location to another. A cable television company can dedicate an unused channel on which to transmit the signals of the musicians telephone interface which could also carry not only audio signal for use with the musicians telephone interface but also, if desired, video signal.

Although the present invention has been described with reference to particular embodiments, it will be apparent to those skilled in the art that variations and modifications can be substituted therefor without departing from the principles and spirit of the invention.

We claim:

1.

A telephone interface system having at least two units, one at each of at least two locations, each unit comprising:

means to interconnect the audio output of two or more musicians, at least one at an instant location and the other at a remote location over telephone lines, said means including:

means to interconnect said units to telephone lines;

input means in each unit at said instant and remote locations to receive local musical audio input from said musicians and provide an input means signal;

interface means in each unit at said instant and remote locations to receive said input means signals including means to direct such input signals from said instant location to said remote location and to direct such input means signals from said remote location to said instant location over said telephone lines;

first amplification means at said instant and remote unit locations to amplify selected of said local musical audio input means signals at said instant location from said input means;

a first transformer having an input and first, second and third outputs, said first transformer input receiving said local amplified musical audio input signal from said first amplification means, said first transformer splitting such audio input signal to its first, second and third outputs;

a second transformer receiving said audio output signal from said remote location through said means to interconnect said unit to said telephone lines, said second transformer also receiving said local musical signal input from said first output of said first transformer, said second transformer directing said local audio signal through said means to interconnect said units to said telephone lines to said remote location;

a third transformer having an output, said third transformer receiving said audio output signal from said remote location and said audio output signal from said instant location from said second output of said first transformer;

a variable resistor having an input and output receiving local audio output signal at its input from said third output of said first transformer;

a comparator having an output, said comparator receiving the remote and local audio output signals from said third transformer's output and directing said remote audio signal directly to said comparator's output, said comparator also receiving the local audio output signal from said output of said variable resistor and, if in phase, with the local output from said third transformer, said comparator directing said local audio output signal to the output of said comparator and if said local audio output signal from said variable resistor is out of phase with the local audio output signal from said third transformer, said comparator cancelling such local audio output signals and not directing them to said comparator's output;

second amplification means having an input and output at each of said instant and remote locations to receive and amplify said signals coming from said comparator; and speaker means at said instant and remote locations to broadcast said amplified signals from said comparator to be heard at each of said instant and remote locations.

2. The interface system of claim 1 further including:

means to switch instant location audio signals and remote location audio signals back and forth between the unit at the instant location and remote location at a speed where the switching is inaudible to any listener; and a synchronization trigger in each unit to adjust said means to switch for accurate synchronization.

3. The system of claim 1 wherein said comparator and variable resistor act as a balancing means to balance the sounds from said instant and remote locations, said balancing means adapted to produce an equality of sound level to balance music audio signals at said instant location with the music audio signals from said remote location so that the musicians at said instant location and remote locations can hear the music of one another simultaneously at desired volume levels balanced for collaboration and production of music.

4. The system of claim 3 further including:

recording means having interconnection to the music signals at said instant location and said remote location through said interface means adapted to record on separate tracks the playing of instrumentation and/or vocalization at said instant location and further to record the combined signals of said remote location instruments and/or vocalizations and instant location instruments and/or vocalizations.

* * * * *